United States Patent

Nagata et al.

[11] Patent Number: 5,522,028
[45] Date of Patent: May 28, 1996

[54] OUTPUT APPARATUS

[75] Inventors: Satoshi Nagata, Tama; Kozo Matsumoto, Tokyo, both of Japan

[73] Assignee: Canon Kabushiki Kaisha, Tokyo, Japan

[21] Appl. No.: 247,420

[22] Filed: May 23, 1994

Related U.S. Application Data

[63] Continuation of Ser. No. 522,582, May 14, 1990, abandoned.

[30] Foreign Application Priority Data

May 17, 1989 [JP] Japan ................... 1-121454

[51] Int. Cl.$^6$ .................................................. G06F 15/20
[52] U.S. Cl. ............................................................ 395/165
[58] Field of Search ................................... 395/150, 151, 395/164, 165, 166, 200 MS File, 900 MS File; 345/141, 142, 143, 144

[56] References Cited

U.S. PATENT DOCUMENTS

| | | | |
|---|---|---|---|
| 4,928,243 | 5/1990 | Hodges et al. | 364/519 |
| 4,941,107 | 7/1990 | Hasebe | 364/518 |
| 5,001,653 | 3/1991 | Buchanan et al. | 364/523 |
| 5,029,109 | 7/1991 | Ikenoue et al. | 364/519 |
| 5,044,790 | 9/1991 | Kawamura | 400/76 |
| 5,051,925 | 9/1991 | Kadono et al. | 364/519 |
| 5,142,620 | 8/1992 | Watanabe et al. | 395/164 |

FOREIGN PATENT DOCUMENTS 121126 10/1984 European Pat. Off. .

OTHER PUBLICATIONS

"Method for Providing Subfont Caching in Hidden Refresh Buffer Space", in IBM Technical Disclosure Bulletin, vol. 29, No. 12 (May 1984), p. 5332.

*Primary Examiner*—Phu K. Nguyen
*Attorney, Agent, or Firm*—Fitzpatrick, Cella, Harper & Scinto

[57] ABSTRACT

An output apparatus for receiving code data from a data source of a host computer and developing it into pattern data and outputting the data. The apparatus includes a pattern generator to generate pattern data; a memory to store the pattern data generated by the pattern generator and obtained in response to an output operation as a font cache; and a controller for controlling the memory such that when an amount of available memory is less than an amount sufficient to store data which is newly input and which has higher priority of storage than the pattern data stored in the cache, the stored pattern data is deleted and the newly input data is stored. An auxiliary character font, form data, or a macro instruction is used as data which is newly input. The pattern data of the font cache in the memory is deleted on the basis of the priority. The pattern data is a dot matrix font pattern which was developed from a nondot matrix font.

38 Claims, 9 Drawing Sheets

| | | | | | | | | |
|---:|---|---|---|---|---|---|---|---|
| 0    | 0 | 0 | 0 | 0 | 0 | 0 | 0 |
| + 4  | 0 | 0 | 0 | 0 | 0 | 0 | 0 |
| + 8  | 0 | 3 | F | F | 8 | 0 | 0 | 0 |
| + 12 | 0 | 3 | F | F | C | 0 | 0 | 0 |
| + 16 | 0 | 3 | F | F | C | 0 | 0 | 0 |
| + 20 | 0 | 0 | 1 | F | E | 0 | 0 | 0 |
| + 24 | 0 | 0 | 1 | F | E | 0 | 0 | 0 |
| + 28 | 0 | 0 | 1 | F | E | 0 | 0 | 0 |
| + 32 | 0 | 0 | 3 | C | F | 0 | 0 | 0 |
| + 36 | 0 | 0 | 3 | C | F | 0 | 0 | 0 |
| + 40 | 0 | 0 | 7 | 8 | 7 | 8 | 0 | 0 |
| + 44 | 0 | 0 | 7 | 8 | 7 | 8 | 0 | 0 |
| + 48 | 0 | 0 | 7 | 8 | 7 | 8 | 0 | 0 |
| + 52 | 0 | 0 | F | 0 | 3 | C | 0 | 0 |
| + 56 | 0 | 0 | F | 0 | 3 | C | 0 | 0 |
| + 60 | 0 | 1 | E | 0 | 1 | E | 0 | 0 |
| + 64 | 0 | 1 | E | 0 | 1 | E | 0 | 0 |
| + 68 | 0 | 1 | E | 0 | 1 | E | 0 | 0 |
| + 72 | 0 | 3 | F | F | F | F | 0 | 0 |
| + 76 | 0 | 3 | F | F | F | F | 0 | 0 |
| + 80 | 0 | 7 | F | F | F | F | 8 | 0 |
| + 84 | 0 | 7 | 8 | 0 | 0 | 7 | 8 | 0 |
| + 88 | 0 | 7 | 8 | 0 | 0 | 7 | 8 | 0 |
| + 92 | 0 | F | 0 | 0 | 0 | 3 | C | 0 |
| + 96 | 0 | F | 0 | 0 | 0 | 3 | C | 0 |
| +100 | 1 | E | 0 | 0 | 0 | 1 | E | 0 |
| +104 | 1 | E | 0 | 0 | 0 | 1 | E | 0 |
| +108 | 7 | F | C | 0 | 0 | F | F | 8 |
| +112 | 7 | F | C | 0 | 0 | F | F | 8 |
| +116 | 7 | F | C | 0 | 0 | F | F | 8 |
| +120 | 0 | 0 | 0 | 0 | 0 | 0 | 0 | 0 |
| +124 | 0 | 0 | 0 | 0 | 0 | 0 | 0 | 0 |

OUTPUT APPARATUS

This application is a continuation of application Ser. No. 07/522,582, filed May 14, 1990, now abandoned.

BACKGROUND OF THE INVENTION

1. Field of the Invention

The present invention relates to an output apparatus for receiving code data from a data source of a host computer or the like and developing into pattern data and outputting.

2. Description of the Related Background Art

In a conventional printer for printing by a dot matrix, a character code or the like which is output from a host computer or the like is input, pattern data corresponding to the character code is read out of a character pattern generator and developed as image data into a frame memory or the like, and thereafter, the image data is output to a recording section of a printer and recorded onto a recording medium. The character pattern data stored in such a character pattern generator can be mainly classified into the following three kinds.

① A dot matrix pattern to express a character pattern (hereinafter, referred to as a dot matrix font)

② A font in which an outline or stroke of a character is expressed by coordinate points for an origin of the character (hereinafter, referred to as a vector font)

③ A font in which a dot matrix pattern is compressed by some compressing technique (for instance, run length or the like) and constructed (hereinafter, referred to as a compression font)

Among those font data, the dot matrix font can be easily pattern developed into a frame buffer. However, since it is unsuitable for a modification of a character or the like, the use of the vector font which can easily cope with the rotation, enlargement, reduction, etc. of a character has been increasing more and more. On the other hand, as a resolution of output apparatus becomes high, a font capacity increases. To cope with it, a compression font is used. Further, in recent years, a mixed type in which the vector font and compression font are combined has been also proposed. Assuming that the above fonts are generally referred to as "nondot matrix type fonts", although the nondot matrix type fonts have advantages which cannot be obtained by the dot matrix font, they have a problem such that it takes a longer time to develop a pattern into an image memory or the like as compared with the simple dot matrix type font.

To solve such a problem, there is a font cache method. According to the font cache method, when a nondot matrix type font is developed into an image buffer or the like, font data or the like whose use frequency is high is previously developed into the dot matrix type font and stored into a cache memory (RAM), and when developing into image data, by using the pattern data, a whole processing speed is improved.

In a printer or the like having such a font cache, in association with a variation of a print output, before print data is output from a host computer, font data, auxiliary font data, form data (pattern such as a background of each page or the like), etc. which have previously been formed by the user can be downloaded and registered. The downloaded data is ordinarily stored into a fixed area in the font cache. Therefore, even if the downloading function is not used, a size of font cache is limited. On the contrary, in spite of the fact that a font data amount in the font cache is small, an amount of font data or the like to be downloaded is limited.

SUMMARY OF THE INVENTION

The present invention is made in consideration of the above conventional example and it is an object of the invention to provide an image output apparatus in which an area is dynamically assured in a font cache memory, an area priority in the memory is given to data to be downloaded, so that the memory can be efficiently used and a processing speed of the whole apparatus can be raised.

In consideration of the above points, another object of the invention is to provide an image output apparatus for receiving code data from an external apparatus and developing into pattern data and outputting, wherein the output apparatus comprises: pattern generating means for generating the corresponding pattern data based on the code data; pattern memory means for storing the pattern data generated from the pattern generating means into a memory as a font cache; memory means for receiving the data from the external apparatus and storing into the memory; and control means for controlling in a manner such that upon storage by the memory means, when a residual amount in the memory is less than a capacity enough to store the data from the external apparatus, the pattern data of the font cache is deleted and the data is stored.

Still another object of the invention is to provide an output apparatus (method) comprising: pattern generating means for generating pattern data; memory means for storing the pattern data generated by the pattern generating means as a font cache; and control means for controlling in a manner such that when a residual amount of the memory means is less than a capacity enough to store the other data which is newly input and whose priority regarding the storage is higher than the priority of the pattern data, the pattern data of the font cache is deleted and the newly input data is stored.

Further another object of the invention is to provide an output apparatus (method) comprising: memory means for storing pattern data as a font cache; discriminating means for discriminating whether a capacity enough to store data which is newly input and whose priority regarding the storage is higher than the priority of the pattern data can be obtained in the memory means by deleting at least a part of the pattern data or not; and storage control means for deleting the pattern data in accordance with a predetermined priority in the case where it is determined by the discriminating means that such a capacity can be obtained.

Further another object of the invention is to provide an output apparatus (method) comprising: memory means for storing pattern data as a font cache and storing data whose priority regarding the storage is higher than the priority of the pattern data; discriminating means for discriminating whether an instruction to delete at least a part of the data stored in the memory means has been input or not; and control means for controlling the memory means in order to expand an area to store the pattern data in the case where it is determined by the discriminating means that such an instruction has been input.

BRIEF DESCRIPTION OF THE DRAWINGS

FIG. 3 is a diagram for explaining font data;

DETAILED DESCRIPTION OF THE PREFERRED EMBODIMENTS

A preferred embodiment of the present invention will be described in detail hereinbelow with reference to the drawings. The invention can be embodied in one apparatus or may be also embodied in a system comprising a plurality of apparatuses.

[Explanation of the laser beam printer (FIG. 2)]

Prior to explaining a construction of the embodiment, a construction of a laser beam printer to which the embodiment is applied will be first described with reference to FIG. 2.

Figure 2:
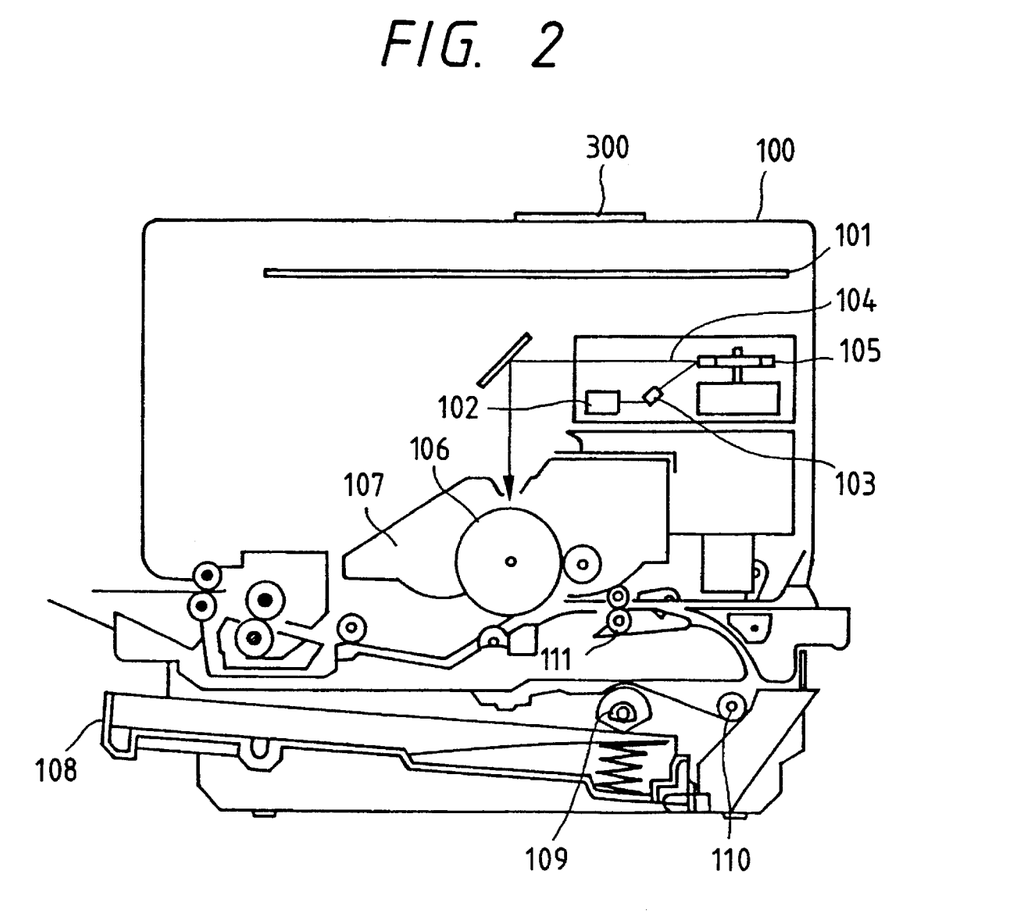
FIG. 2 is a cross sectional view showing a construction of the laser beam printer of the embodiment.

FIG. 2 is a cross sectional view showing an internal structure of the laser beam printer (hereinafter, abbreviated to LBP) of the embodiment. The LBP can register character patterns from a data source (not shown) and can also register a standard format (from data) and the like.

In the diagram, reference numeral 100 denotes an LBP main body for receiving and storing character data (character code), form data, a macro instruction (an instruction to register a series of command groups in a lump), etc. which are supplied from a host computer (201 in FIG. 1) connected to the outside. The LBP main body 100 makes the corresponding character pattern, form pattern, or the like in accordance with those data and forms an image onto a recording paper as a recording medium. Reference numeral 300 denotes an operation panel in which switches for operation, an LED display, and the like are arranged. Reference numeral 101 indicates a printer control unit for controlling the whole LBP 100 and analyzing character data or the like which is supplied from the host computer. The printer control unit 101 mainly converts character data into a video signal of the corresponding character pattern and outputs to a laser driver 102.

The laser driver 102 is a circuit to drive a semiconductor laser 103 and on/off switches a laser beam 104 which is generated from the semiconductor laser 103 in accordance with an input video signal. The laser beam 104 is oscillated to the right and left by a rotary polyhedron 105 and scans on an electrostatic drum 106. Thus, an electrostatic latent image of a character pattern is formed on the drum 106. The latent image is developed by a developing unit 107 arranged around the drum 106 and, thereafter, it is copy transferred onto the recording paper. A cut sheet is used as a recording paper. The cut sheet recording papers are enclosed in a paper cassette 108 attached to the LBP 100 and are taken into the apparatus by a paper feed roller 109 and conveying rollers 110 and 111 and are fed to the drum 106.

[Description of the control system of the printer (FIG. 1)]

Figure 1:
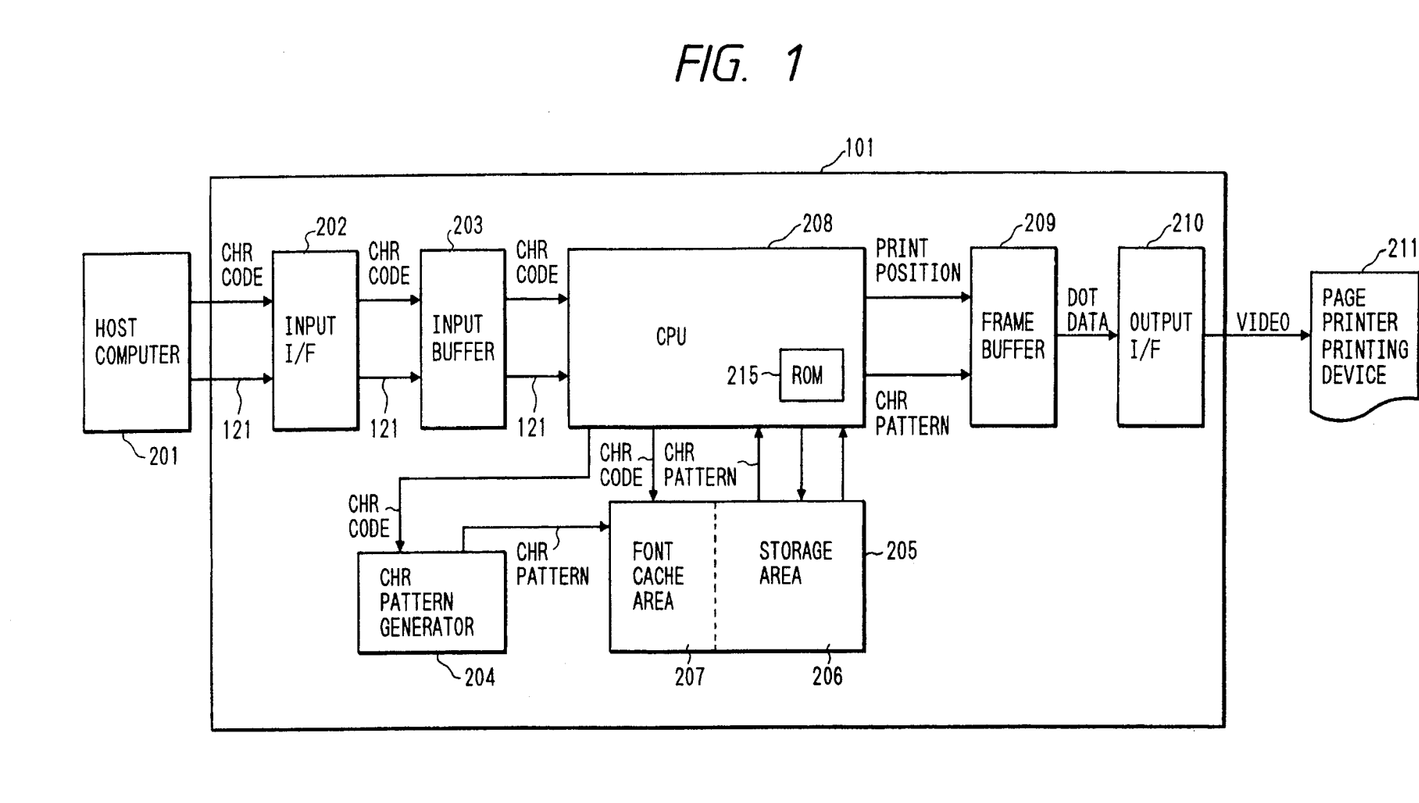
FIG. 1 is a block diagram showing a schematic construction of a control system of a laser beam printer according to an embodiment.

FIG. 1 is a block diagram showing a schematic construction of a control system of the laser beam printer shown in FIG. 2.

The control system of the LBP receives character codes sent from the host computer 201 as a generating source of print data and data 121 comprising an auxiliary character font (for instance, a download font), form data, macro registration data, etc. and controls so as to print document data or the like on a page unit basis. Reference numeral 202 denotes an input interface section to input various data from the host computer 201; 203 indicates an input buffer to temporarily store the various data which were input through the input interface section 202; and 204 a character pattern generator. The generator 204 includes a ROM in which pattern data corresponding to character codes which were compressed by, for instance, a run length method, ordinary character codes, and the like are stored, a read control circuit of the ROM, and the like. The generator 204 also has a code converting function such that when a character code is input, an address of the character pattern corresponding to the input character code is calculated.

Reference numeral 205 denotes a RAM including a font cache area 207 to store character patterns which were output from the character pattern generator 204 and a storage area 206 to store an auxiliary character font, form data, etc. which were sent from the host computer 201. As mentioned above, by storing the pattern data which was once developed to the character pattern into the font cache area 207 as a font cache, when the same character is printed, there is no need to again decode the same character and to develop the pattern. Thus, a developing speed to the character pattern becomes fast.

Reference numeral 208 denotes a CPU to control the whole control system of the printer. The CPU 208 controls the whole apparatus by a control program of the CPU 208 stored in the ROM 215. Reference numeral 209 denotes a frame buffer in which the pattern data which was developed to the character patterns is stored by an amount of at least one page in correspondence to a print image. Reference numeral 210 denotes an output interface section for generating a video signal corresponding to the pattern data which was read out of the frame buffer 209 and executing the interface control between the output interface section 210 and a page printer printing device 211. Reference numeral 211 denotes the printing mechanism section of a page printer for receiving the video signal from the output interface section 210 and printing image data based on the video signal.

[Description of the font data (FIG. 3)]

Figure 3A:
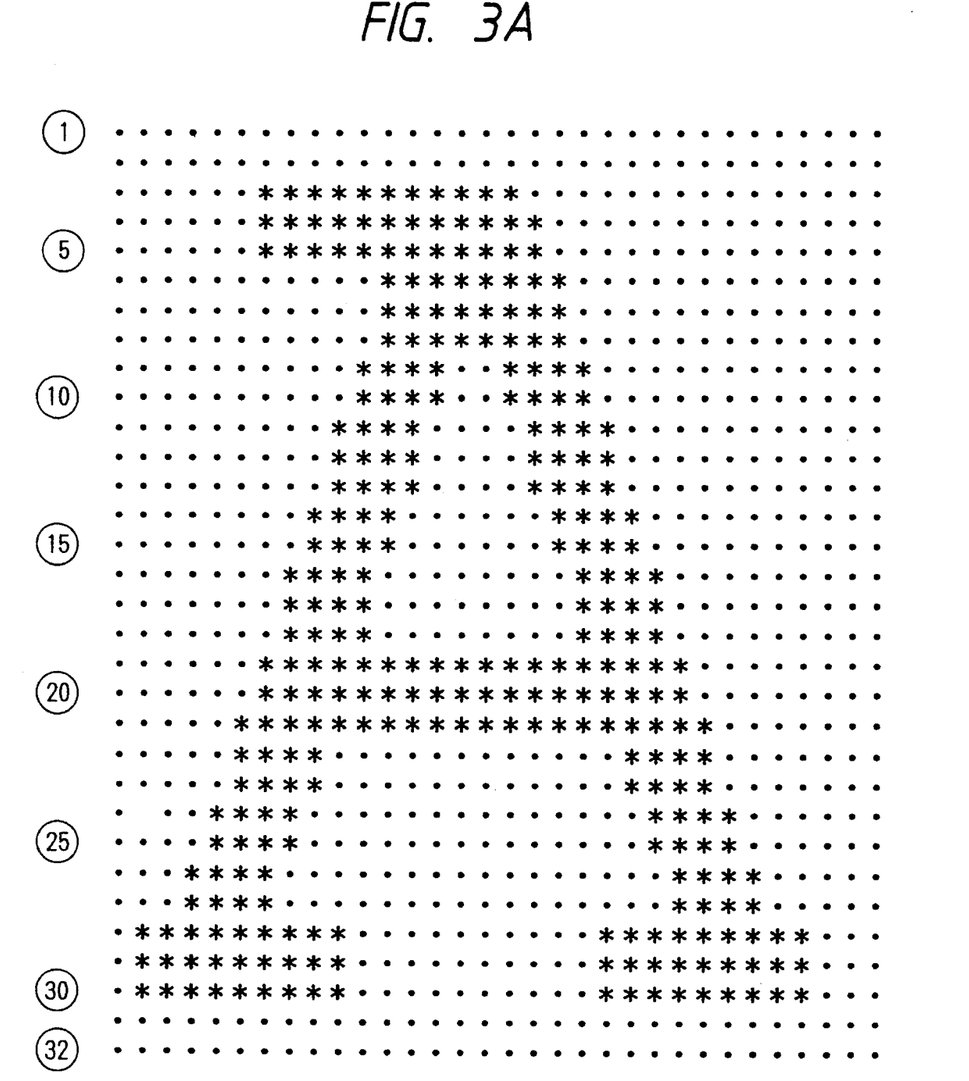
FIG. 3A is a diagram showing a character pattern shape.
Figure 3B:
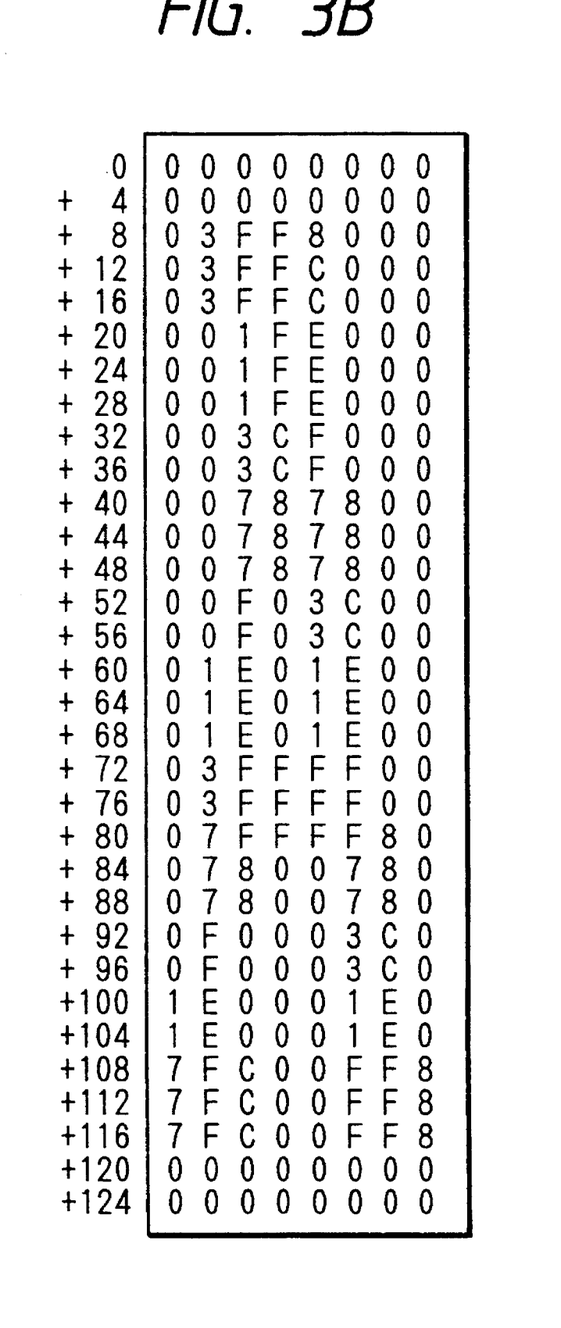
FIG. 3B is a diagram showing dot matrix pattern data of FIG. 3A.

FIG. 3 is a diagram for explaining the difference between a dot matrix font and a nondot matrix font. FIG. 3A is a diagram visually showing an original dot pattern (32×32 dots) which is not processed yet. A "*" portion indicates a portion in which an image is formed in black. FIG. 3B shows data in the case where the dot pattern of FIG. 3A was expressed by hexadecimal data. Data of the portion which is printed in black indicates "1" and data of the dot portion which is not printed is shown by "0". The dot pattern shown in FIG. 3B is constructed by 128 bytes and corresponds to the image data which is stored into the font cache 207 and frame buffer 209.

Figure 3C:
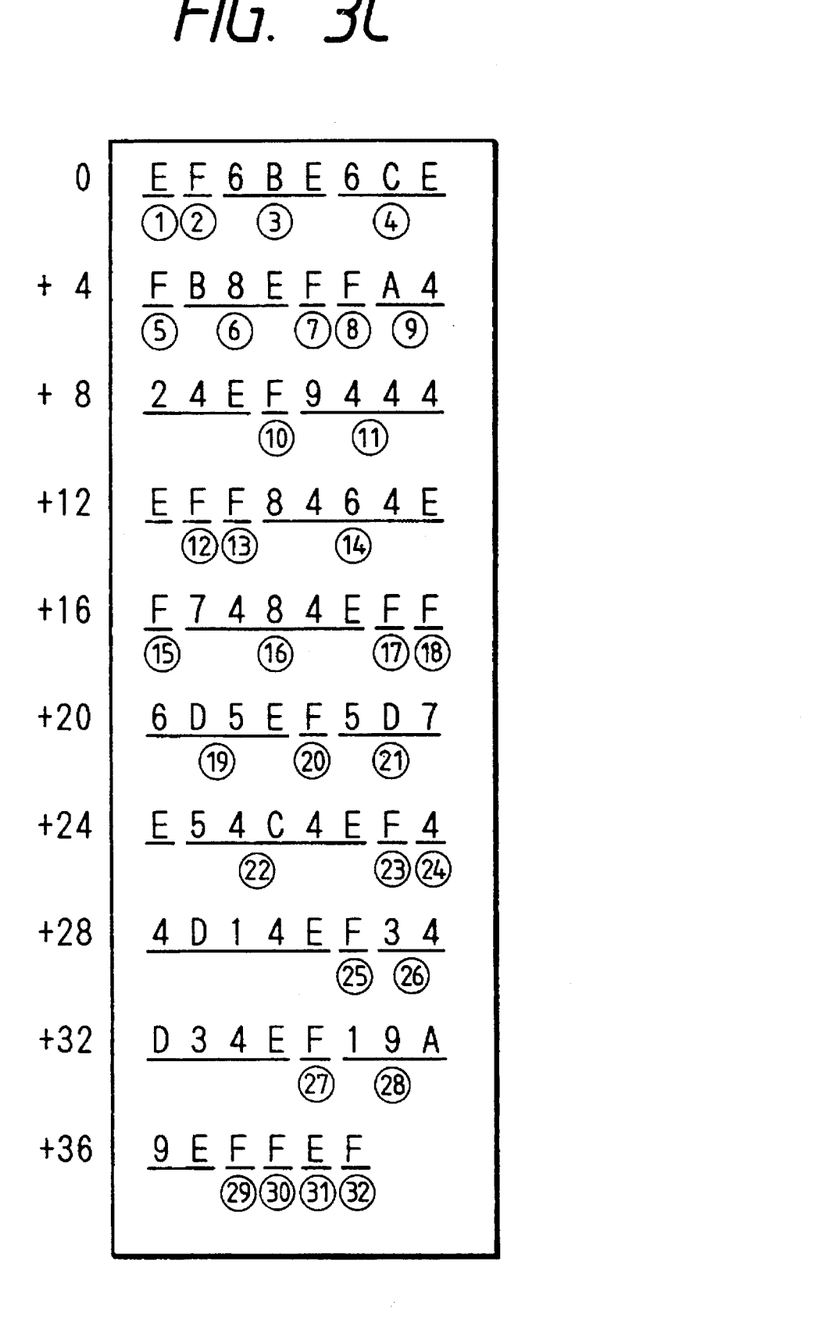
FIG. 3C is a diagram showing run length data of the pattern data of FIG. 3B.

FIG. 3C shows data in the case where the dot pattern data of FIG. 3B was compressed by using the run length. The pattern data of 128 bytes is compressed into the data of 38 bytes. The run length method will now be described hereinbelow.

① A unit of each code is set to four bits.

② A delimiter code E (hexadecimal number) is provided on each horizontal direction (scanning direction) unit.

③ The code E further indicates that in one scan, all of the bits after the code E are set to "0".

④ The same scan data as the just preceding scan data is expressed by a code F (hexadecimal number).

⑤ Each of the code units (each consisting of four bits) in one scan is expressed in accordance with the order of white and black and is repeated hereinafter.

⑥ However, when the length is 13 or more, each code unit is expressed by the sum of a code D (hexadecimal number) and one code unit (four bits) subsequent thereto. That is, the length is expressed by eight bits in only the above case.

A numeral surrounded by o in FIG. 3C indicates the scan number in a manner similar to FIG. 3A. For instance, the content "8464E" of the 14th scan shows that "from the left side, 8 bits are set to white, 4 bits are set to black, 6 bits are set to white, 4 bits are set to black, and all of the subsequent bits are set to white". On the other hand, the content "44D14E" of the 24th scan denotes that "from the left side, 4 bits are set to white, 4 bits are set to black, 14 (13+1) bits are set to white, 4 bits are set to black, and all of the subsequent bits of the 24th scan are set to white".

By using the above rule, the character pattern of 128 bytes which are expressed by FIG. 3B is compressed to the data of 32 bytes. In the embodiment, the font data stored in the character pattern generator 204 is set to the compressed nondot matrix font as shown in FIG. 3C.

[Description of the data format from the host computer 201 (FIGS. 4 to 6)]

Figure 4:
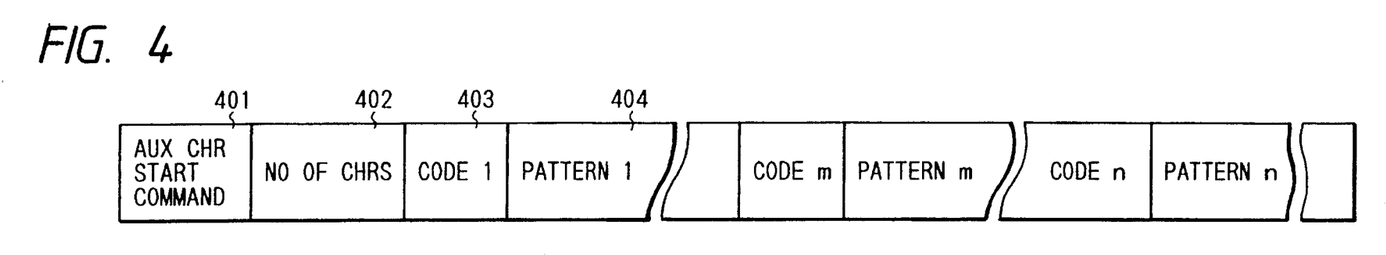
FIG. 4 is a diagram showing an example of a transmission format of auxiliary font data from a host computer.

FIG. 4 is a diagram showing an example of a data format of auxiliary character font registration data which is output from the host computer 201 when an auxiliary character font is stored into the storage area 206 in the RAM 205. The format data is input through the input interface section 202 and is temporarily held in the input buffer memory 203.

In FIG. 4, reference numeral 401 denotes an auxiliary character start command to indicate that the subsequent data is the registration data of the auxiliary character font; 402 a parameter having a fixed length of four bytes indicative of the number of characters which are registered as an auxiliary character font; 403 a character code which is assigned to the auxiliary character pattern; and 404 pattern data corresponding to code "1". In this case, total n character patterns are stored. The character pattern is set to a fixed length of 32×32 dots. That is, a length of character pattern "1" is set to a fixed length of 128 bytes. On the other hand, it is assumed that the auxiliary character font in the embodiment is set to a dot matrix pattern as shown in FIG. 3B.

Figure 5:
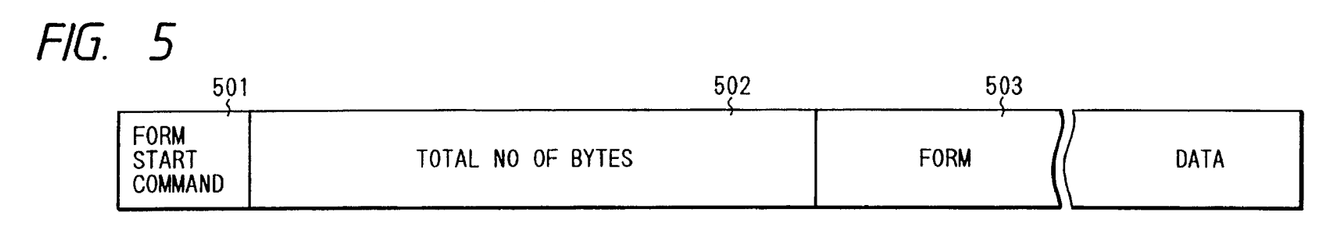
FIG. 5 is a diagram showing an example of a transmission format of form data from the host computer.

FIG. 5 is a diagram showing an example of a format of form registration data. In a manner similar to the foregoing auxiliary character registration data, form registration data is output from the host computer 201 and stored into the input buffer memory 203.

Reference numeral 501 denotes a start command to indicate that the subsequent data is the form registration data; 502 a parameter having a fixed length indicative of the total number of bytes of the data to be registered as a form; and 503 a data area of the form data as it is. Those form data may be also input from an ROM cassette or the like (not shown) and copied into the RAM.

Figure 6:
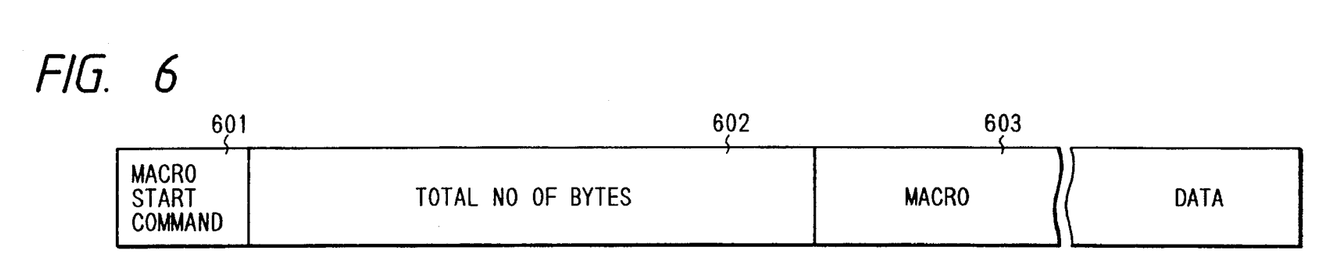
FIG. 6 is a diagram showing an example of a transmission format of macro instruction data from the host computer.

FIG. 6 is a diagram showing an example of a data format when macro registration data is input from the host computer 201. Reference numeral 601 denotes a macro start command; 602 a parameter having a fixed length of four bytes indicative of a length of subsequent macro data; and 603 macro data to be registered.

When at least one of the above data is sent from the host computer 201, the data is stored into the storage area 206 in the RAM 205 and is used for the subsequent print control.

[Description of the use state of the RAM 205 (FIG. 7)]

Figure 7:
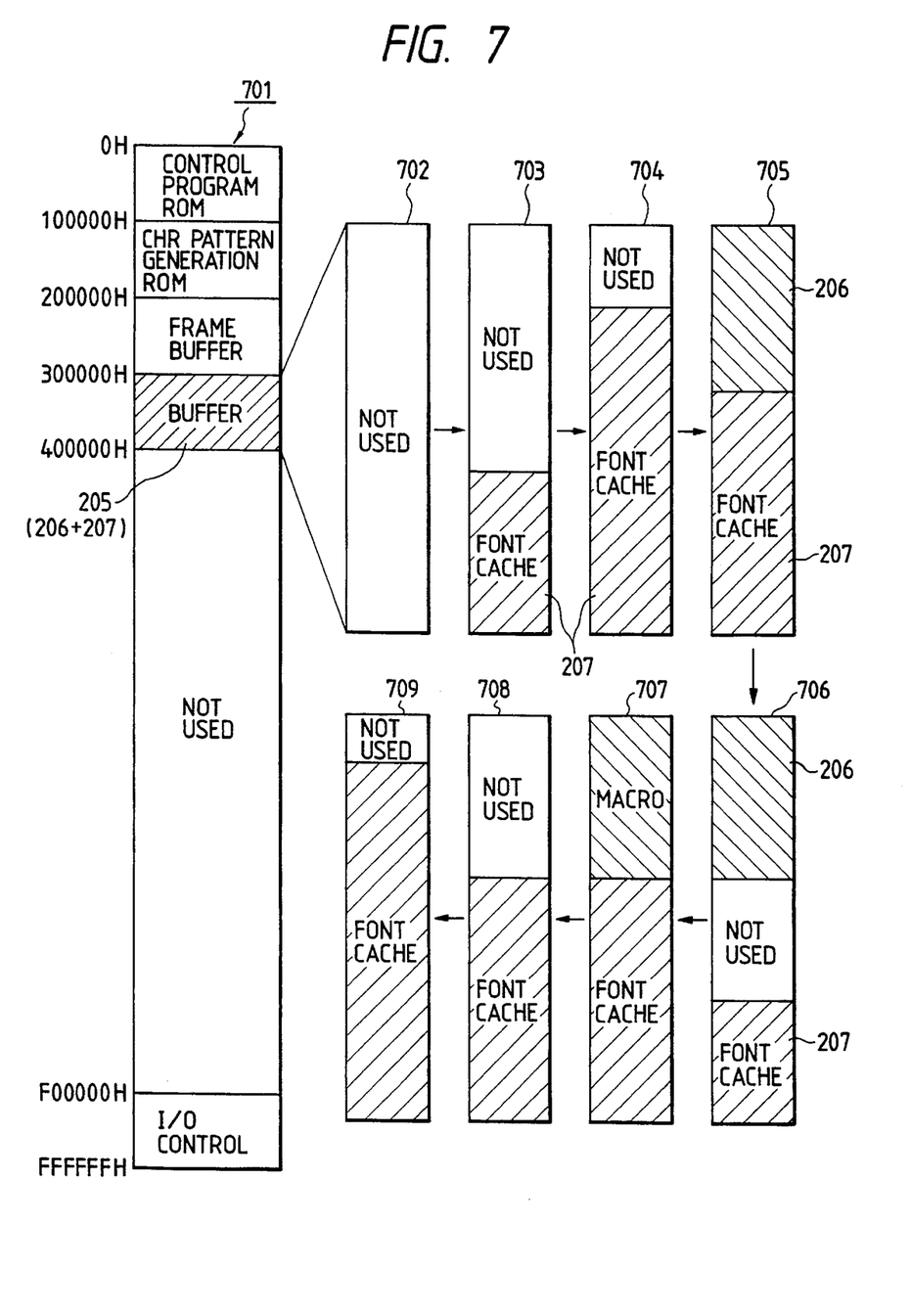
FIG. 7 is a diagram for explaining a used memory space in a memory.

FIG. 7 is a diagram for explaining the use state of the memory 205.

In the diagram, reference numeral 701 denotes a memory map of each construction of the whole apparatus when it is seen from the side of the CPU 208. The memory map 701 has a memory space of 16 Mbytes as a whole. A memory space assigned to the font cache area 207 and storage area 206 is set to a memory space of 1 Mbytes from address "300000H" (H denotes the hexadecimal number) to address "3FFFFFH". Reference numerals 702 to 709 time sequentially indicate use states of the memory space in the memory 205.

Reference numeral 702 denotes the use state of the memory 205 just after the power source of the apparatus was turned on, in which all of the areas have been cleared and are not used now. Reference numeral 703 denotes the state in which print data had been sent from the host computer 201 and the printing was executed. The font data which was used to print is developed to the pattern and the dot matrix data is stored as a font cache (207). Reference numeral 704 denotes the state in which the printing was further executed and the capacity of the font cache was enlarged. Although the capacity was set to 400 kbytes in the state of 703, it is increased to 800 kbytes in the state of 704. The number of bytes of the unused area at this time is set to 200 kbytes.

When the registration data as shown in any one of FIGS. 4 to 6 is transferred from the host computer 201 in the state of 704, since the priority of the registration data which was transferred from the host computer 201 is higher, the font cache is deleted to obtain an area to store the registration data from the host computer 201. In this manner, the font cache is further reduced by 200 kbytes and the registration data from the host computer 201 occupies 400 kbytes as shown in the state of 705.

As mentioned above, since the font cache exists to improve the whole print throughput, even if the capacity of the font cache is reduced, the printing itself does not become impossible. Therefore, by paying attention to the fact that the significance of the data from the host computer 201 is higher, the priority of the font cache is set to a low priority.

Reference numeral 706 denotes the state in which the font cache was further automatically deleted. In the state of 706, the characters are cleared in accordance with a predetermined algorithm on the basis of a use frequency of the font data, an LRU (least recently used: the pattern which was most recently used remains) system, or the like and the cache area is reduced. Reference numeral 707 denotes the state in which the font area was enlarged by printing further another form, printing a character of a large character size, or the like. However, in this case as well, the capacity of the font cache is also limited such that the registration data from the host computer 201 is not erased from the memory 205.

Reference numeral 708 denotes the state in which a part of the registration data from the host computer 201 became unnecessary and a clearing instruction of such a partial data was input from the host computer 201. For instance, assuming that macro instructions of Nos. 1 to 8 have been registered, FIG. 7 shows the state in the case where an instruction to clear (or rewrite) only the macro instructions Nos. 3 and 5 was input. Due to this, all of the areas (400 kbytes) which have been assured by the registration data from the host computer 201 are released and are set to the "not used" state. Thus, the area of the font cache can be further expanded and the font cache increases as shown in the state of 709.

Figure 8:
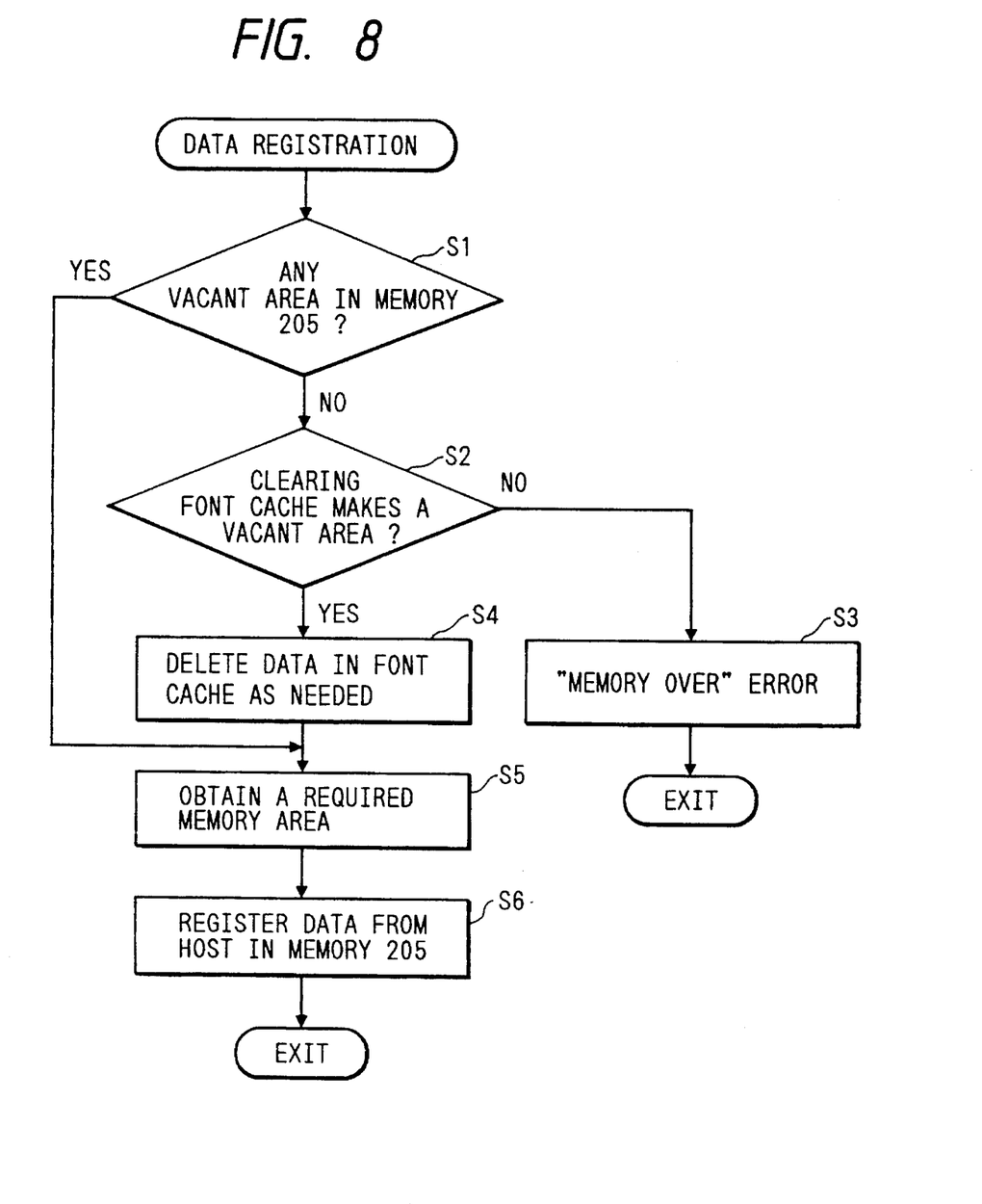
FIG. 8 is a flowchart showing a registering process of data from the host computer.

[Registration of data from the host computer]

FIG. 8 is a flowchart showing a process to register data from the host computer 201 in the printer of the embodiment. A control program to execute the data registering process is stored in an ROM 215 in the CPU 208.

When data from the host computer 201 is received, step S1 follows and a check is made to see if any vacant area exists in the memory 205 or not on the basis of the number of characters and the total number of bytes of the reception data of the data format shown in FIGS. 4 to 6. If YES, step S5 follows. If NO, step S2 follows and a check is made to see if a storage area can be obtained by clearing the data in the font cache 207 or not. If NO, step S3 follows and a "MEMORY OVER" error is displayed and the processing is finished or the processing routine is skipped. If YES in step S2, step S4 follows.

In step S4, the data in the font cache 207 is deleted by only the amount of the lack of the capacity of the storage area 206 and step S5 follows. In step S5, the area necessary to store the data from the host computer 201 is obtained in the memory 205. In step S6, the data from the host computer 201 is transferred to the storage area 206 in the memory 205 and registered.

[Description of the font caching process (FIG. 9)]

Figure 9:
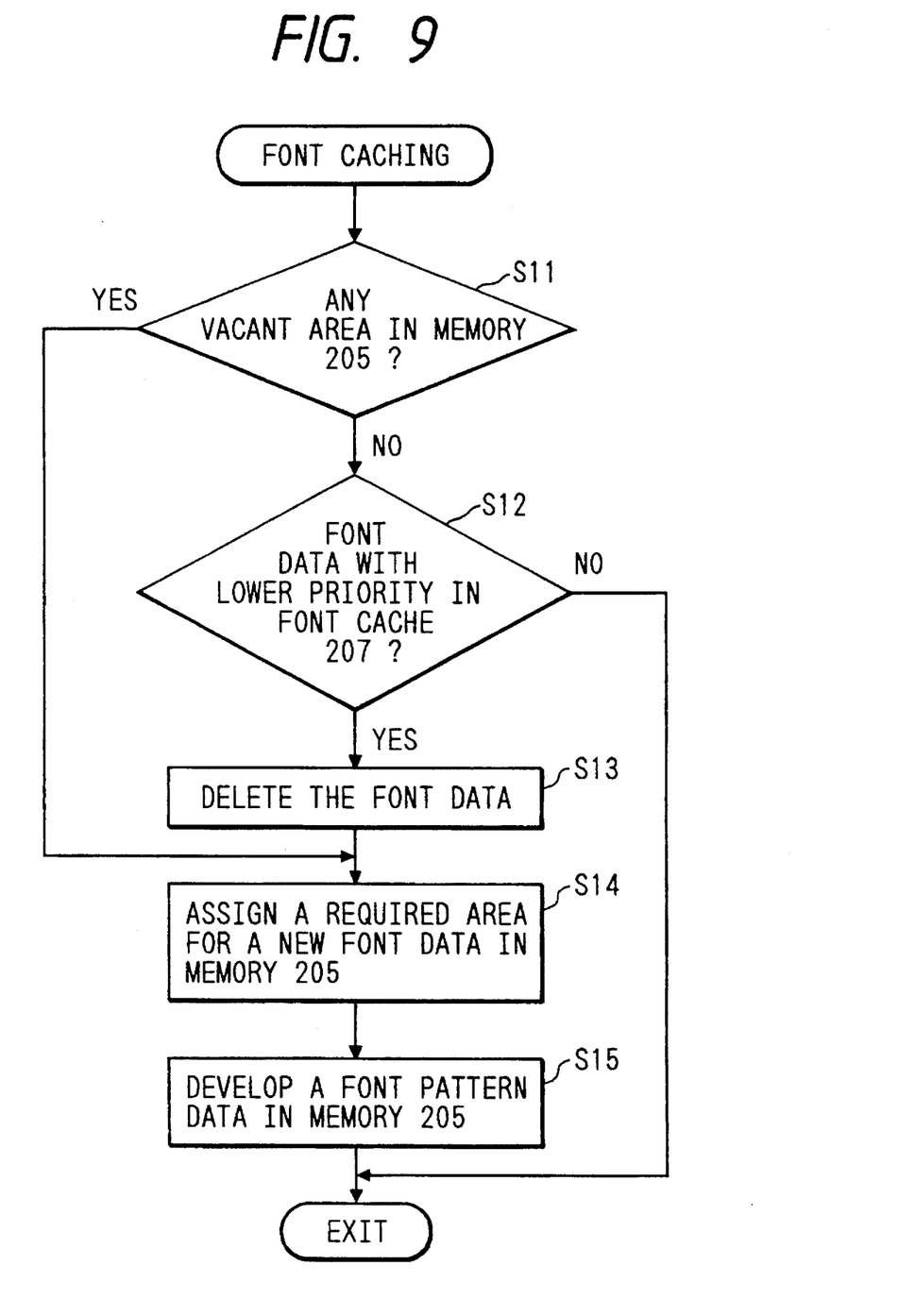
FIG. 9 is a flowchart showing a font caching process.

FIG. 9 is a flowchart showing a font caching process. A control program to execute the font caching process is stored in the ROM 215 and is executed when the character pattern corresponding to the character code is not stored at present in the font cache 207. However, as described in the states 707 and 708 in FIG. 7, for instance, in the case where a deletion instruction of the macro instruction is input, the area to be deleted can be also assured as a cache area. Even in this case, there is a large possibility such that the result of the discrimination in step S11 in FIG. 9 is YES.

First, in step S11, the total number of bytes of the relevant character pattern data is obtained and a check is made to see if a vacant area sufficient to store such an amount of data exists in the memory 205 or not. If YES, step S14 follows. Such a discrimination is synthetically executed on the basis of the character size, form, LRU, and the like. If no vacant area exists, step S12 follows and a check is made to see if any font data having a lower priority exists in the font cache 207 or not. If YES, step S13 follows and the font data of the lower priority is deleted from the font cache 207.

In the next step S14, a capacity as much as the font data to be newly stored is obtained in the memory 205. In step S15, the font pattern data is developed in the memory 205 and set to the font cache 207. The pattern data which is registered to the font cache 207 is the data which was converted from the nondot matrix form to the dot matrix pattern.

Although the embodiment has been described above with respect to the case of an apparatus such as a laser beam printer to print, the invention can be also applied to a display device such as a CRT to display a dot image or the like.

On the other hand, although the embodiment has been described with respect to the case where the font data based on the run length method was used as nondot matrix type font data, the invention can be also applied to other various font data such as outline font to store what is called outline coordinates, font data to store a stroke of character, font data formed by synthesizing a bush of Chinese character, and the like.

Although the embodiment has been described in the case where the font cache and data registration area were set into the RAM, they can be also replaced by another memory medium (hard disk or the like). Further, although the embodiment has been described with respect to the case where data which is sent from the host computer 201 was set to the auxiliary character font, form data, and macro instruction, the storage form and execution form are not limited in particular. For instance, the execution of macro instruction may be also nested.

On the other hand, form instructions can be stored by a group of form instruction as it is, by a bit map memory as a whole, or by an intermediate storage system and are not limited to the form data of one page. A nondot matrix type can be also obviously used as an auxiliary character font.

As described above, according to the embodiment, there is an advantage such that the memory can be efficiently used by dynamically managing the area to store the data from the host computer and the font cache.

In addition, when the data from the host computer does not exist, all of the storage areas in the memory can be used as a font cache. If the data (auxiliary character font, form data, macro instruction, or the like) from the host computer exists, by giving the higher priority to such a data, the storage area in the font cache is not limited.

As described above, according to the invention, there are advantages such that by dynamically obtaining a storage area in the font cache memory and giving the higher priority of the storage area in the memory to the data which is down loaded, the memory can be efficiently used and the processing speed of the whole apparatus can be made fast.

As described in detail above, according to the invention, it is possible to provide an output apparatus (method) comprising: pattern generating means for generating pattern data; memory means for storing the pattern data generated by the pattern generating means as a font cache; and control means for controlling in a manner such that if a residual amount in the memory means is smaller than a capacity enough to store other data which is newly input and whose priority regarding the storage is higher than the priority of the pattern data, the pattern data of the font cache is deleted and the data which was newly input is stored.

As described in detail above, according to the invention, it is possible to provide an output apparatus (method) comprising: memory means for storing pattern data as a font cache; discriminating means for discriminating whether a capacity enough to store data which is newly input and whose priority regarding the storage is higher than the priority of the pattern data can be obtained in the memory means by deleting at least a part of the pattern data or not; and storage control means for deleting the pattern data in accordance with a predetermined priority in the case where it is determined by the discriminating means that such a capacity can be obtained.

As described in detail above, according to the invention, it is possible to provide an output apparatus (method) comprising: memory means for storing pattern data as a font cache and for storing data whose priority regarding the storage is higher than the priority of the pattern data; discriminating means for discriminating whether an instruction to delete at least a part of the data stored in the memory means has been input or not; and control means for controlling the memory means so as to expand an area for storage of the pattern data in the case where it is determined by the discriminating means that such a deletion instruction has been input.

We claim:

1. An output apparatus comprising:

pattern generating means for generating pattern data;

memory means having an area capable of storing, as a font cache, pattern data generated by said pattern generating means; and control means for variably controlling the area capable of storing, as a font cache, the pattern data on the basis of input of data different from the pattern data stored in the area as a font cache, the different data having higher priority than the pattern data.

2. An apparatus according to claim 1, wherein said control means variably controls the area by deleting the pattern data from the area and storing the newly input different data in the area.

3. An apparatus according to claim 1, wherein the different data comprises auxiliary character data, form data or macro data.

4. An apparatus according to claim 1, wherein the pattern data comprises a dot matrix font pattern which was generated based on a non-dot matrix font.

5. An apparatus according to any of claims 3 or 4, wherein the different data is given by a host computer.

6. An apparatus according to claim 4, wherein the non-dot matrix font is an outline font, stroke font or run-length compressed font.

7. An apparatus according to claim 1, wherein the pattern data is generated based on non-dot matrix data.

8. An apparatus according to claim 1, further comprising a printer for printing the generated pattern data.

9. An apparatus according to claim 2 or 8, further comprising a host computer for giving the different data to said apparatus.

10. An apparatus according to claim 1, further comprising a display for displaying the generated pattern data.

11. A printer comprising:

input means for inputting data received from an external apparatus;

generating means for generating character pattern data on the basis of font data of non-dot form;

first memory means for storing the character pattern data generated by said generating means;

second memory means for storing print data based on the character pattern data stored in said first memory means;

print means for executing a printing operation based on the print data stored in said second memory means; and registration means for discriminating whether said first memory means has a vacant storage area in the event that said input means inputs, from the external apparatus, data having a higher registration priority than the character pattern data stored in said first memory means, and for deleting the character pattern data stored in said first memory means and registering the data input by said input means in response to a discrimination that said first memory means has no vacant storage area.

12. A printer according to claim 11, wherein the external apparatus comprises a host computer.

13. A printer according to claim 11, wherein the non-dot form font data comprises outline font, stroke font or run-length compressed data.

14. A printer according to claim 11, wherein said first memory means comprises a cache memory.

15. A printer according to claim 11, wherein said second memory means comprises a frame buffer.

16. A printer according to claim 11, wherein said print means comprises a laser beam printer.

17. A printer according to claim 11, wherein the registered data comprises auxiliary font data, form data or macro data.

18. A printer according to claim 11, wherein said registration means determines whether the input data can be registered by deleting the stored character pattern data and registers the input data in response to a determination that the input data can be registered by deleting the stored character pattern data.

19. A printer according to claim 18, wherein said registration means issues an alarm indicative of an error in response to a determination that the input data cannot be registered even by deleting the stored character pattern data.

20. An output method using a memory having an area capable of storing pattern data generated as a font cache, said method comprising the steps of:

generating pattern data; and variably controlling the area capable of storing, as a font cache, the pattern data on the basis of input of data different from the pattern data stored in the area as a font cache, the different data having higher priority than the pattern data.

21. A method according to claim 20, wherein said controlling step includes variably controlling the area by deleting the pattern data from the area and storing the different data newly input in the area.

22. A method according to claim 20, wherein the different data comprises auxiliary character data, form data or macro data.

23. A method according to claim 20, wherein the pattern data comprises a dot matrix font pattern which was generated based on a non-dot matrix font.

24. A method according to any of claims 22 or 23, wherein the different data is received from a host computer.

25. A method according to claim 23, wherein the non-dot matrix font comprises an outline font, stroke font or run-length compressed font.

26. A method according to claim 20, wherein the pattern data is generated based on non-dot matrix data.

27. A method according to claim 20, further comprising the step of printing the generated pattern data.

28. A method according to claim 21 or 27, further comprising the step of receiving the different data from a host computer.

29. A method according to claim 20, further comprising the step of displaying the generated pattern data.

30. A printing method using:

generating means for generating character pattern data on the basis of font data of non-dot form;

first memory means for storing the character pattern data generated by the generating means;

second memory means for storing print data based on the character pattern data stored in the first memory means; and print means for executing a printing operation based on the print data stored in the second memory means, said method comprising the steps of:

inputting data received from an external apparatus; and discriminating whether the first memory means has a vacant storage in the event that data having a higher registration priority than the stored character pattern data is input from the external apparatus in said inputting step and deleting the stored character pattern data and registering the data input in said inputting step in response to a discrimination that the first memory means has no vacant storage area.

31. A method according to claim 30, wherein the external apparatus comprises a host computer.

32. A method according to claim 30, wherein the non-dot form font data comprises outline font, stroke font or run-length compressed data.

33. A method according to claim 30, wherein the first memory means comprises a cache memory.

34. A method according to claim 30, wherein the second memory means comprises a frame buffer.

35. A method according to claim 30, wherein the print means comprises a laser beam printer.

36. A method according to claim 30, wherein the registered data comprises auxiliary font data, form data or macro data.

37. A method according to claim 30, wherein said registering includes determining whether the input data can be registered by deleting the stored character pattern data, and registering the input data in response to a determination that the input data can be registered by deleting the stored character pattern data.

38. A method according to claim 37, wherein said registering issues an alarm indicative of an error in response to a determination that the input data cannot be registered even by deleting the stored character pattern data.

* * * * *